(12) United States Patent
Yoshiyama

(10) Patent No.: US 12,482,307 B2
(45) Date of Patent: Nov. 25, 2025

(54) VEHICLE EQUIPPED WITH SELF-DIAGNOSTIC SYSTEM

(71) Applicant: TOYOTA JIDOSHA KABUSHIKI KAISHA, Toyota (JP)

(72) Inventor: Tomoaki Yoshiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 18/640,355

(22) Filed: Apr. 19, 2024

(65) Prior Publication Data
US 2024/0386755 A1    Nov. 21, 2024

(30) Foreign Application Priority Data

May 19, 2023    (JP) ................. 2023-082729

(51) Int. Cl.
G07C 5/00      (2006.01)
G07C 5/08      (2006.01)
H04L 25/02     (2006.01)
H04W 4/40      (2018.01)

(52) U.S. Cl.
CPC ............. *G07C 5/008* (2013.01); *G07C 5/085* (2013.01); *H04L 25/0262* (2013.01); *H04W 4/40* (2018.02); *G07C 2205/02* (2013.01)

(58) Field of Classification Search
None
See application file for complete search history.

(56) References Cited

U.S. PATENT DOCUMENTS

| | | | |
|---|---|---|---|
| 6,636,790 B1 * | 10/2003 | Lightner ............... | G06Q 90/00 701/31.4 |
| 6,728,603 B2 * | 4/2004 | Pruzan ................ | H04L 12/4604 701/1 |
| 8,036,788 B2 * | 10/2011 | Breed .................. | G07C 5/0808 701/31.9 |

FOREIGN PATENT DOCUMENTS

JP       2013-028238 A       2/2013

* cited by examiner

*Primary Examiner* — Abdhesh K Jha
(74) *Attorney, Agent, or Firm* — SoraIP, Inc.

(57) ABSTRACT

The vehicle includes a vehicle control ECU including a recording unit that records a self-diagnosis result and the like as diagnostic data, and a gateway ECU. The gateway ECU has a function of outputting diagnostic data to a diagnostic tool outside the vehicle when diagnosing the vehicle, a function of measuring a communication speed when outputting the diagnostic data to the diagnostic tool, a function of determining whether to perform advance transmission of the diagnostic data on the basis of a measurement result of the communication speed, and a function of performing advance transmission of the diagnostic data to a management server outside the vehicle through wireless communication when it is determined that the advance transmission is performed.

5 Claims, 4 Drawing Sheets

VEHICLE EQUIPPED WITH SELF-DIAGNOSTIC SYSTEM

CROSS-REFERENCE TO RELATED APPLICATION

This application claims priority to Japanese Patent Application No. 2023-082729 filed on May 19, 2023, incorporated herein by reference in its entirety.

BACKGROUND

1. Technical Field

The present disclosure relates to vehicles.

2. Description of Related Art

As described in Japanese Unexamined Patent Application Publication No. 2013-028238 (JP 2013-028238 A), a vehicle collects and records various types of diagnostic data in order to promptly respond to a failure. A mechanic such as a dealership reads the diagnostic data recorded in the vehicle to a diagnostic tool outside the vehicle to diagnose the vehicle.

For example, when an enormous amount of diagnostic data is accumulated in the vehicle, it takes a long time to read the diagnostic data from the vehicle to the diagnostic tool. As a result, the diagnosis time may be increased.

SUMMARY

A vehicle that solves the above problem includes: a recording unit configured to record diagnostic data to be used to diagnose the vehicle; an output unit configured to output the diagnostic data recorded in the recording unit to a diagnostic tool outside the vehicle; a measurement unit configured to measure a communication speed when the output unit outputs the diagnostic data to the diagnostic tool; a determination unit configured to determine whether to perform advance transmission based on a measurement result of the communication speed from the measurement unit; and a transmission unit configured to transmit the diagnostic data recorded in the recording unit to outside of the vehicle through wireless communication when the determination unit determines to perform the advance transmission.

The vehicle advantageously reduces an increase in diagnosis time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a vehicle will be described in detail with reference to FIG. 1 to FIG. 5.

Configuration of Vehicle 10

Figure 1:
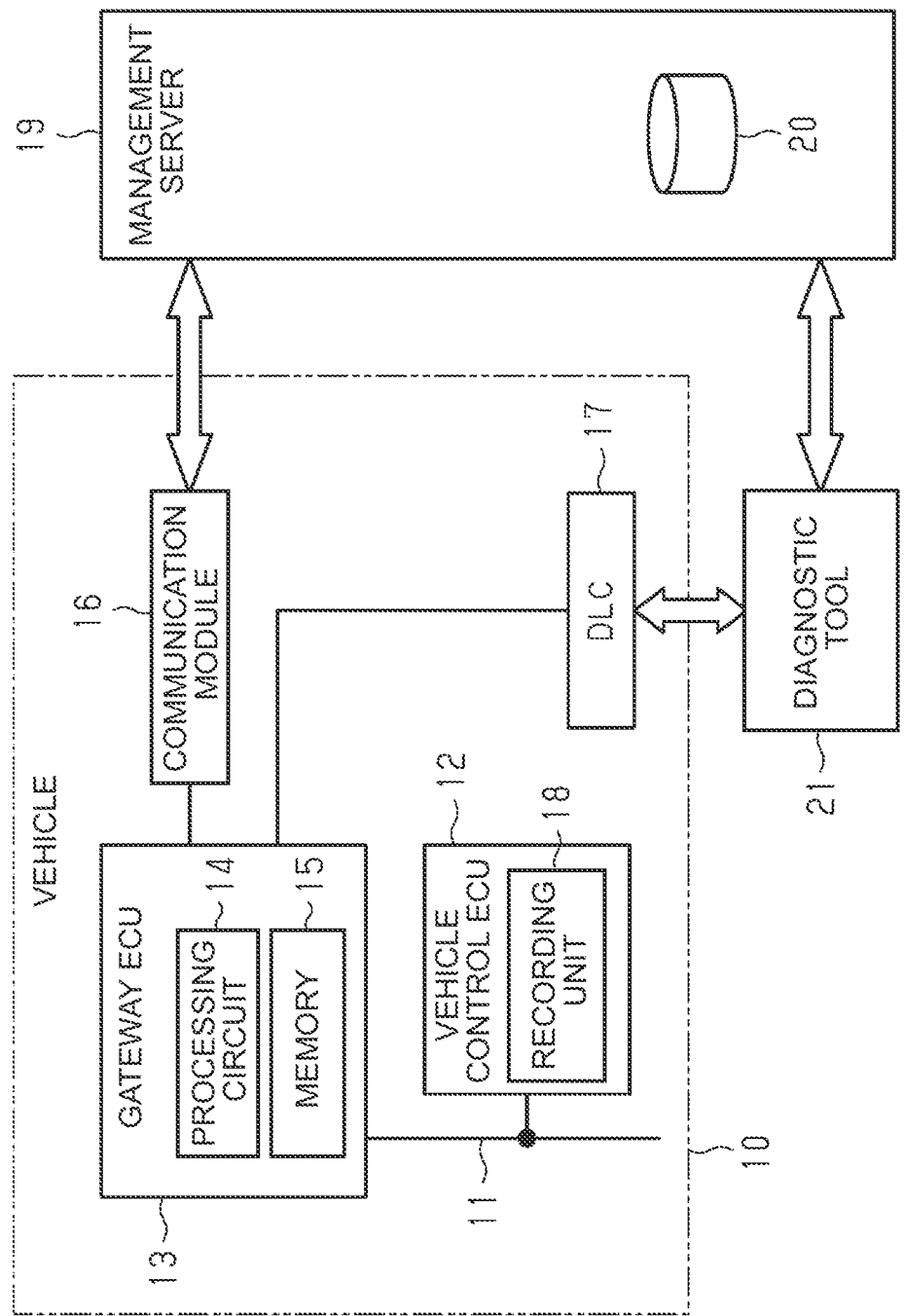
FIG. 1 is a diagram schematically illustrating a configuration of an embodiment of a vehicle.

First, the configuration of the vehicle 10 of the present embodiment will be described with reference to FIG. 1.

The vehicle 10 includes an in-vehicle network 11. Various electronic control units for vehicle control are installed in the in-vehicle network 11. Examples of the electronic control unit for vehicle control include an electronic control unit for engine control, an electronic control unit for brake control, and an electronic control unit for shift control. In the following explanation, such an electronic control unit for vehicle control is referred to as a vehicle control ECU 12. FIG. 1 shows only one of a plurality of vehicle control ECU 12 mounted on a vehicle 10. The vehicle-control ECU 12 has a self-diagnosis function. The vehicle control ECU 12 includes a recording unit 18 that is a data storage for recording diagnostic data that is data used for diagnosing the vehicle 10. The diagnostic data includes the self-diagnosis of the vehicle control ECU 12 and various kinds of data indicating the operation status of the vehicle 10.

A gateway ECU 13, which is an electronic control unit for managing communication, is installed in the in-vehicle network 11. The gateway ECU 13 includes a memory 14 that stores a program and data for managing communication, and a processor 15 that executes the program read from the memory 14.

A communication module 16 for wirelessly connecting to a wireless LAN and a mobile communication network is connected to the gateway ECU 13. The communication module 16 enables radio communication between the gateway ECU 13 and the management server 19 outside the vehicle. The management server 19 is a server device for managing information of each vehicle 10 under management. The management server 19 includes a database 20 that records information of each vehicle 10.

A DLC (data link connector) 17, which is a connector for wired connection with a device outside the vehicle, is connected to the gateway ECU 13. In a dealer or the like, a diagnosis of the vehicle 10 is performed by connecting a diagnostic tool 21 outside the vehicle to a DLC 17. The diagnostic tool 21 has a function of reading data necessary for diagnosis of the vehicle 10 from the vehicle 10 and displaying the data. In addition, the diagnostic tool 21 is configured to be able to communicate with the management server 19 through a wide-area information communication network such as the Internet.

In the vehicle 10 of the present embodiment, the communication speed between the gateway ECU 13 and the vehicle control ECU 12 via the in-vehicle network 11 is lower than the communication speed between the management server 19 and the diagnostic tool 21 via the wide area communication network. The communication speed between the gateway ECU 13 and the vehicle control ECU 12 via the in-vehicle network 11 is lower than the communication speed between the gateway ECU 13 via DLC 17 and the diagnostic tool 21.

Diagnosis of Vehicle 10

Figure 2:
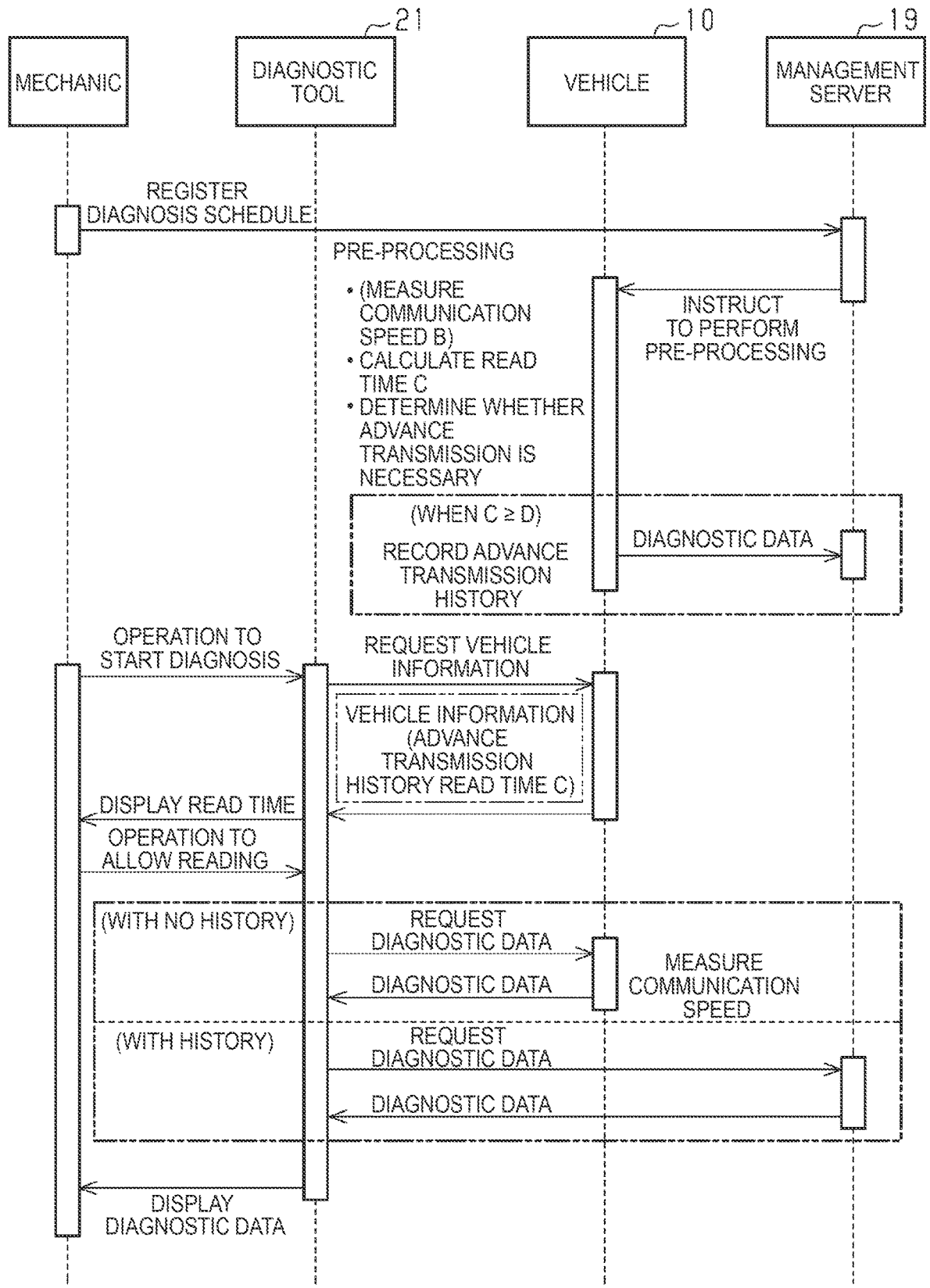
FIG. 2 is a sequence diagram showing a flow of processing at the time of diagnosis of the vehicle.

FIG. 2 shows a flow of processing at the time of diagnosis of the vehicle 10. In the following description, an operator who performs diagnosis of the vehicle 10 at a dealer or the like is referred to as a mechanic. FIG. 2 shows a case where the user carries the vehicle 10 to the dealer and performs diagnosis at a predetermined date and time between the mechanic and the user.

When the scheduled diagnosis of the vehicle 10 is determined, the mechanic registers the date and time in the management server 19. When the diagnostic date and time are registered, the management server 19 instructs the vehicle 10 to be diagnosed to perform the preliminary processing. In response to this command, the gateway ECU 13 of the vehicles 10 performs pre-processing. The instruction for such pre-processing and the time of execution are determined based on the date and time of diagnosis so as to be earlier than that.

Figure 3:
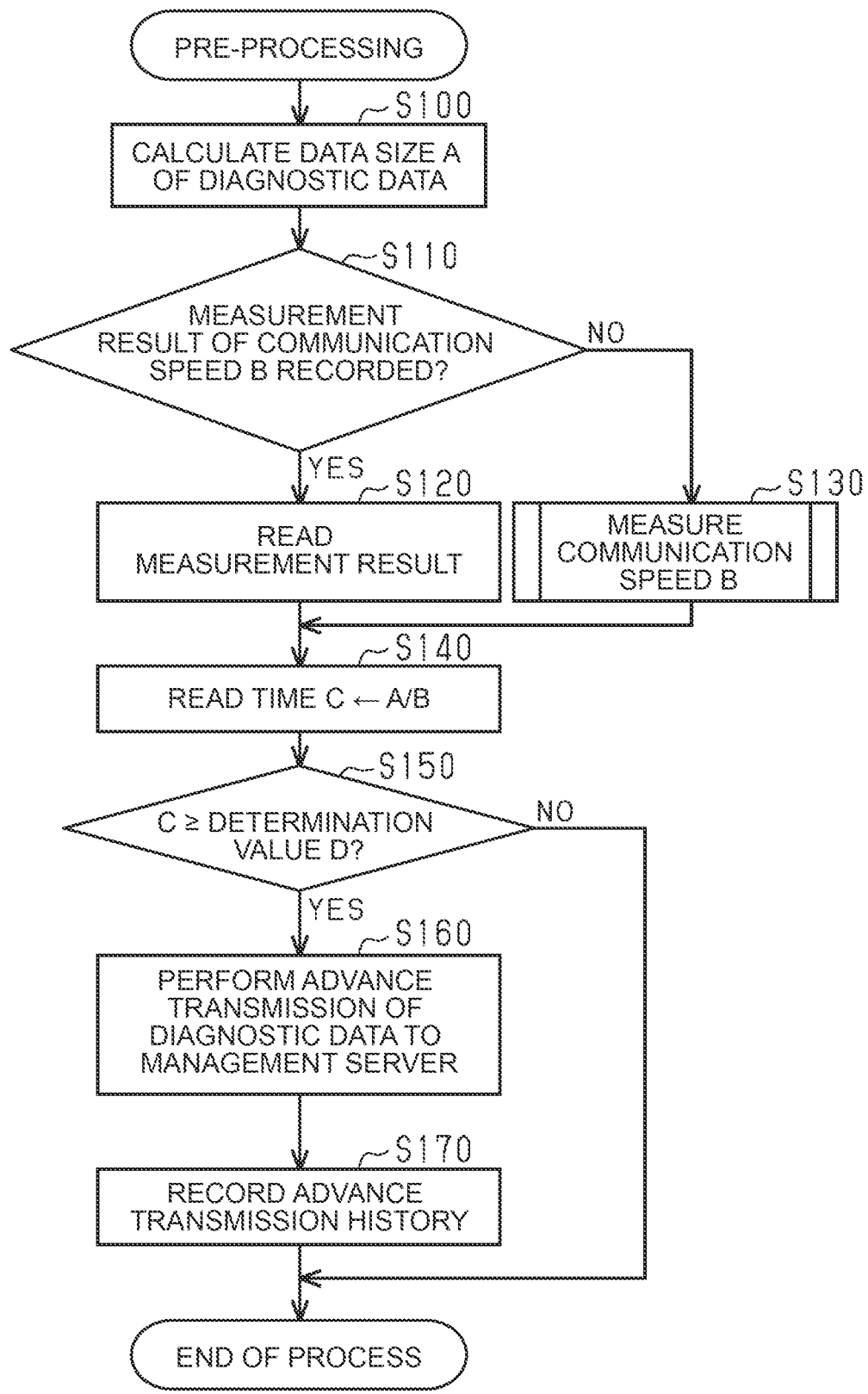
FIG. 3 is a flowchart of pre-processing performed in the vehicle.

FIG. 3 shows a flowchart of the pre-processing. In the preprocessing, the gateway ECU 13 first calculates the data size A of the diagnostic data recorded in the recording unit 18 of the vehicle control ECU 12 in S100. Next, the gateway ECU 13 checks whether or not the measured communication speed B has been recorded in S110. When the measurement result is recorded (YES), the gateway ECU 13 reads the measurement result of the recorded communication speed B in S120. When the measurement is not recorded (NO), the communication speed B is measured in S130. Details of the processing related to the measurement will be described later.

Thereafter, in S140, the gateway ECU 13 divides the data size A by the communication speed B, and calculates the divided value as the value of the read time C of the diagnostic data. The read time C represents a predicted value of the time required for reading the diagnostic data from the vehicle 10 to the diagnostic tool 21.

Next, in S150, the gateway ECU 13 determines whether or not the read time C is equal to or greater than a predetermined determination value D. In the determination value D, an upper limit value of an allowable time is set as the read time C of the diagnostic data at the time of diagnosis. When the read time C is less than the determination value D (NO), the gateway ECU 13 ends the preprocessing as it is. On the other hand, when the read time C is equal to or greater than the determination value D (YES), the gateway ECU 13 transmits the diagnostic data to the management server 19 in advance (advance transmission) in S160. Then, the gateway ECU 13 records the advance transmission history in S170, and ends the pre-processing. The advance transmission history is history information indicating that advance transmission of the diagnostic data to the management server 19 has been performed.

Figure 4:
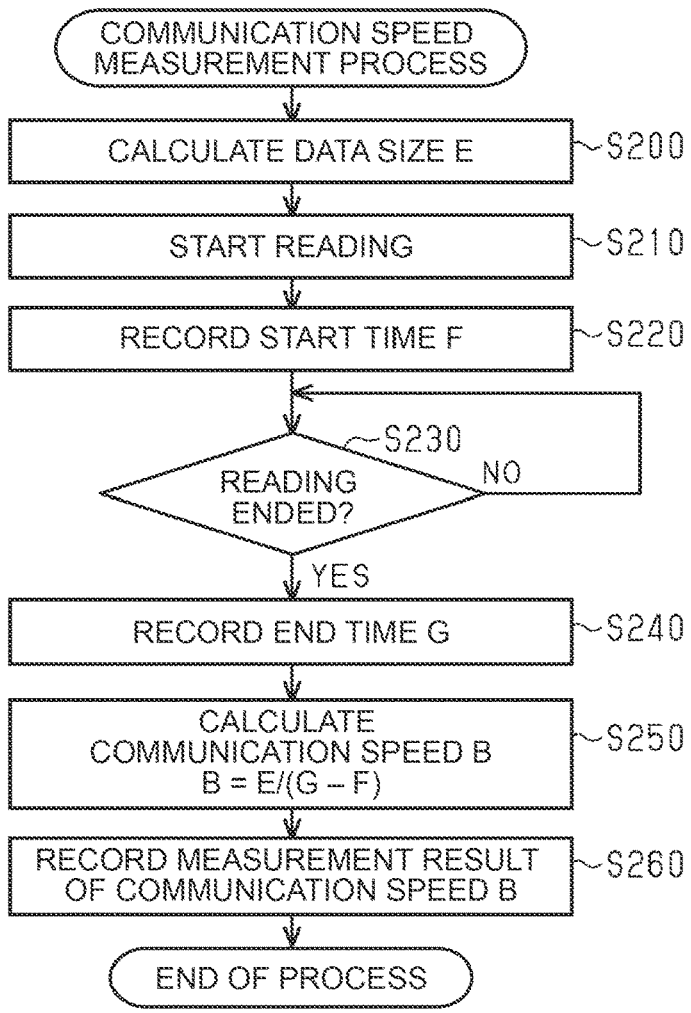
FIG. 4 is a flow chart of a communication speed measuring process executed in the vehicle.

FIG. 4 shows a flow chart of a process of measuring the communication speed B performed by the gateway ECU 13 in the vehicle 10. In addition to S110 of FIG. 3, the gateway ECU 13 performs the same process at the time of reading the diagnostic data from the vehicles 10 to the diagnostic tool 21.

In the measuring process, the gateway ECU 13 first calculates the data size E of the diagnostic data to be read from the vehicle control ECU 12 in S200. In a subsequent S210, the gateway ECU 13 starts reading diagnostic data from the vehicle-control ECU 12. Then, the gateway ECU 13 records the starting time F of reading the diagnostic data in the following S220. At this time, the diagnostic data read by the gateway ECU 13 may be all or a part of the diagnostic data recorded in the recording unit 18 of the vehicle control ECU 12. Alternatively, the gateway ECU 13 may read dummy diagnostic data for measuring the communication speed B instead of the actual diagnostic data.

When the reading of the diagnostic data is completed (YES in S230), the gateway ECU 13 records the ending time G of the reading in S240. Then, the gateway ECU 13 calculates the communication speed B based on the data size E, the starting time F, and the ending time G in S250. Specifically, the gateway ECU 13 first obtains the required time (=G−F) for reading the diagnostic data from the starting time F and the ending time G. Then, the gateway ECU 13 divides the data size E by the required time, and calculates the divided value as the value of the communication speed B. After that, the gateway ECU 13 records the calculation of the communication speed B in S260, and then terminates the measuring process.

In S130 in the preliminary processing of FIG. 3, the measuring processing is performed while the diagnostic tool 21 is not connected. Generally, the communication speed between the gateway ECU 13 and the vehicle control ECU 12 via the in-vehicle network 11 is slower than the communication speed between the gateway ECU 13 and the diagnostic tool 21 via DLC 17. Therefore, the communication speed B measured by S130 of FIG. 3 is considered to be approximately equal to the communication speed of the diagnostic data output from the gateway ECU 13 to the diagnostic tool 21.

Next, with reference to FIGS. 2 and 5, a process performed after the vehicle 10 is brought into a dealer or the like will be described. A mechanic connects the diagnostic tool 21 to DLC 17 of the vehicle 10 at the time of diagnosis at a dealer or the like. The diagnostic tool 21 requests the vehicle 10 to transmit vehicle information in response to an operation of starting diagnosis by a mechanic. In response to this request, the gateway ECU 13 of the vehicle 10 transmits the vehicle information to the diagnostic tool 21. The gateway ECU 13 includes the read time C calculated by the pre-processing in the vehicle information transmitted to the diagnostic tool 21 at this time. In addition, the gateway ECU 13 includes the advance transmission history in the vehicle information to be transmitted to the diagnostic tool 21 when the diagnostic data is transmitted to the management server 19 in the pre-processing.

Upon receiving the vehicle information, the diagnostic tool 21 displays a screen for permitting reading of the diagnostic data. On the permission screen, a read time C read from the vehicle 10 is displayed in addition to a button for a read permission operation. When the mechanic performs a read permission operation, the diagnostic tool 21 executes a diagnostic data read process.

Figure 5:
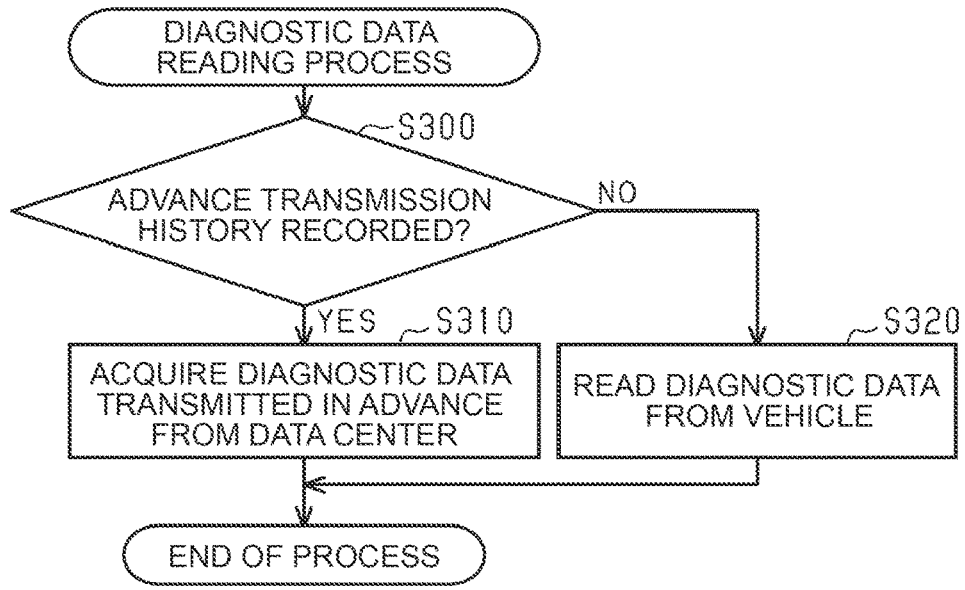
FIG. 5 is a flow chart of a diagnostic data reading process executed by a diagnostic tool used for diagnosing of the vehicles.

FIG. 5 shows a flowchart of the diagnostic data reading process. In this process, the diagnostic tool 21 first determines whether or not the vehicle data read from the vehicle 10 includes the advance transmission history in S300. When the advance transmission history is included (YES in S300), the diagnostic tool 21 acquires diagnostic data from the management server 19 (S310). On the other hand, when the advance transmission history is not included (NO in S300), the diagnostic tool 21 reads the diagnostic data from the vehicles 10 (S320).

As shown in FIG. 2, when the diagnostic tool 21 reads the diagnostic data from the vehicle 10, the gateway ECU 13 measures the communication speed B. The gateway ECU 13 updates the measured value of the recorded communication speed B. Measuring at this time is performed through the process of FIG. 4. In this case, the measurement of the communication speed B is performed in a state where the diagnostic tool 21 is actually connected to the vehicle 10. Therefore, in the measurement at this time, there is a possibility that the communication speed B can be measured more accurately than in the measurement in the pre-processing performed in a state where the diagnostic tool 21 is not actually connected.

Operation and Effect of Embodiment

The action and effect of the present embodiment will be described. The vehicle control ECU 12 performs self-diagnosis while the vehicle 10 is in operation. Then, the vehicle control ECU 12 records the self-diagnosis and the like in the recording unit 18 as the diagnostic data used for the diagnosis of the vehicle 10. The read time C of the diagnostic data from the vehicle 10 by the diagnostic tool 21 is determined by the data size E of the diagnostic data recorded in the recording unit 18 and the communication speed B between the vehicle control ECU 12 and the diagnostic tool 21.

On the other hand, even if the types of the vehicles 10 are the same, the device configuration of the in-vehicle network 11 may be different. The communication speed B of the in-vehicle network 11 may vary depending on the device configuration. When the communication speed B is low, depending on the data size E of the diagnostic data, the read time C of the diagnostic data of the diagnostic tool 21 may be longer than an allowable upper limit.

In contrast, the gateway ECU 13 measures the communication speed B in the pre-processing. Further, the gateway ECU 13 calculates the read time C of the diagnostic data based on the communication speed B and the data size E. When the read time C exceeds a predetermined time, the gateway ECU 13 transmits the diagnostic data to the management server 19. The management server 19 stores the received diagnostic data in the database 20.

In the subsequent diagnosis, the diagnostic tool 21 confirms whether advance transmission of the diagnostic data is performed based on the vehicle information acquired from the vehicle 10. Then, the diagnostic tool 21 acquires the diagnostic data from the management server 19 when the advance transmission has been performed. The diagnostic tool 21 acquires the diagnostic data from the vehicle 10 when the advance transmission is not performed. Therefore, when it is predicted that the read time C of the diagnostic data from the vehicle 10 exceeds a certain time, the diagnostic tool 21 acquires the diagnostic data from the management server 19. The acquisition of the diagnostic data from the management server 19 via the wide area information communication network can be performed at a higher speed than the reading of the diagnostic data from the vehicle 10. Therefore, in the case of acquiring the data from the management server 19, the diagnostic data can be captured in the diagnostic tool 21 in a shorter time than in the case of directly reading the data from the vehicle 10. Therefore, the vehicle 10 of the present embodiment has an effect of suppressing an increase in the diagnosis time due to the reading of the diagnostic data.

In the vehicle 10 of the present embodiment, the gateway ECU 13 corresponds to an output unit that outputs the diagnostic data recorded in the recording unit 18 to the outside diagnostic tool 21. The gateway ECU 13 also corresponds to a measurement unit that measures the communication speed B when the output unit outputs the diagnostic data to the diagnostic tool 21, and a determination unit that determines whether to perform advance transmission based on the measurement result of the communication speed B by the measurement unit. Furthermore, the gateway ECU 13 also corresponds to a transmission unit that transmits the diagnostic data recorded in the recording unit 18 to the outside of the vehicle through radio communication when the determination unit determines to perform the advance transmission.

According to the vehicle 10 of the present embodiment, the following effects can be obtained.

(1) The vehicle 10 of the present embodiment includes a recording unit 18 that records diagnostic data used for diagnosis of the vehicle 10. The vehicle 10 further includes a gateway ECU 13 corresponding to the output unit, the measurement unit, the determination unit, and the transmission unit. As described above, the vehicle 10 configured as described above has an effect of suppressing an increase in diagnosis time.

(2) The gateway ECU 13 calculates the read time C of the diagnostic data by the diagnostic tool 21 based on the measurement result of the communication speed B and the data size A of the diagnostic data recorded in the recording unit 18. Then, the gateway ECU 13 determines to perform advance transmission of the diagnostic data to the management server 19 when the read time C is equal to or greater than the predetermined determination value D. Therefore, the gateway ECU 13 can accurately determine whether advance transmission of the diagnostic data to the management server 19 is necessary based on the prediction of the read time C.

(3) When the diagnostic tool 21 is connected to the vehicles 10, the gateway ECU 13 outputs the calculation result of the read time C to the diagnostic tool 21. The diagnostic tool 21 displays the received read time C to the mechanic. Therefore, the mechanic can grasp the read time C of the diagnostic data to the diagnostic tool 21 and perform the work.

(4) In the preprocessing, the gateway ECU 13 measures the reading speed of the diagnostic data from the recording unit 18 to the gateway ECU 13 as the communication speed B. The reading rate of the diagnostic data from the recording unit 18 to the gateway ECU 13 through the in-vehicle network 11 is lower than the transmitting rate of the diagnostic data from the gateway ECU 13 to the diagnostic tool 21. Therefore, even when the diagnostic tool 21 is not connected, the communication speed B at which the gateway ECU 13 outputs the diagnostic data to the diagnostic tool 21 is obtained by measuring the read speed.

(5) The gateway ECU 13 notifies the diagnostic tool 21 of whether to perform advance transmission of the diagnostic data to the management server 19. Thus, the diagnostic tool 21 can confirm whether or not the diagnostic data exists in the management server 19. Therefore, the diagnostic tool 21 can appropriately determine from which of the vehicle 10 and the management server 19 the diagnostic data should be acquired.

Other Embodiments

The present embodiment can be realized with the following modifications. The present embodiment and the following modifications can be combined with each other within a technically consistent range to be realized.

In the vehicle 10 of the above-described embodiment, the pre-processing is performed in accordance with the registration to be diagnosed. The gateway ECU 13 may be configured to periodically perform pre-processing. The gateway ECU 13 performs advance transmission of the diagnostic data to the management server 19 when the data size A of the diagnostic data recorded in the recording unit 18 is increased until the read time C becomes equal to or larger than the determination value D.

In S160 of the preprocessing of FIG. 3, the gateway ECU 13 may be configured to perform advance transmission of a part of the diagnostic data recorded in the recording unit 18 to the management server 19. In this case, in S310 of the reading process of FIG. 5, it is desirable to configure the diagnostic tool 21 to acquire a part of the diagnostic data transmitted in advance from the management server 19 and to read the remaining diagnostic data from the vehicles 10.

Diagnostic data that has been transmitted to the management server 19 in the pre-processing may be deleted from the recording unit 18. When there is an advance transmission history at the time of reading the diagnostic data, the diagnostic tool 21 may be configured to allow the mechanic to select from which of the management server 19 and the vehicle 10 to acquire the diagnostic data after displaying the read time C.

In the vehicle 10 of the above embodiment, the gateway ECU 13 corresponds to the output unit, the measurement unit, the determination unit, and the transmission unit. The vehicle 10 may be configured such that the in-vehicle device other than the gateway ECU 13 connected to the in-vehicle network 11, for example, the vehicle control ECU 12 is a device corresponding to one or more of the output unit, the measurement unit, the determination unit, and the transmission unit.

In the preprocessing of FIG. 3, the gateway ECU 13 measures the communication speed B only when the measurement is not recorded (NO in S110). The gateway ECU 13 may perform the measurement of the communication speed B in the preprocessing regardless of whether the measurement is recorded or not.

What is claimed is:

1. A vehicle comprising:
   a recording unit configured to record diagnostic data to be used to diagnose the vehicle;
   an output unit configured to output the diagnostic data recorded in the recording unit to a diagnostic tool outside the vehicle;
   a measurement unit configured to measure a communication speed when the output unit outputs the diagnostic data to the diagnostic tool;
   a determination unit configured to determine whether to perform advance transmission based on a measurement result of the communication speed from the measurement unit; and
   a transmission unit configured to transmit the diagnostic data recorded in the recording unit to outside of the vehicle through wireless communication when the determination unit determines to perform the advance transmission.

2. The vehicle according to claim 1, wherein:
   the determination unit is configured to calculate time required for the diagnostic tool to read the diagnostic data, based on the measurement result of the communication speed and a data size of the diagnostic data recorded in the recording unit; and
   the determination unit is configured to determine to perform the advance transmission when the time required for the diagnostic tool to read the diagnostic data is equal to or longer than a predetermined time.

3. The vehicle according to claim 2, wherein the output unit is configured to output a calculation result of the required time to the diagnostic tool when the diagnostic tool is connected to the vehicle.

4. The vehicle according to claim 1, wherein the measurement unit is configured to measure a reading speed of the diagnostic data from the recording unit to the output unit as the communication speed.

5. The vehicle according to claim 1, wherein the output unit is configured to, when the diagnostic tool is connected, notify the diagnostic tool of whether transmission of the diagnostic data by the transmission unit is performed.

* * * * *